United States Patent
Haggis et al.

[15] 3,669,920
[45] June 13, 1972

[54] CARBON FIBER-REINFORCED POLYURETHANE COMPOSITES

[72] Inventors: Geoffrey Arthur Haggis, Manchester; Michael Edward Benet Jones; Michael Horace Knight, both of Runcorn, all of England

[73] Assignee: Imperial Chemical Industries Limited, London, England

[22] Filed: March 23, 1970

[21] Appl. No.: 22,065

[30] Foreign Application Priority Data

March 27, 1969 Great Britain..................16,048/69

[52] U.S. Cl..................................260/37 N, 260/77.5 NC
[51] Int. Cl..........................................C08g 51/10
[58] Field of Search..................260/37 N; 23/209.1 F, 2 A

[56] References Cited

UNITED STATES PATENTS

| | | | |
|---|---|---|---|
| 2,751,363 | 6/1956 | Martin | 260/37 N |
| 2,796,331 | 6/1957 | Kauffman | 23/209.1 F |
| 3,061,497 | 10/1962 | Wilson | 260/37 N |
| 3,357,939 | 12/1967 | Reischl | 260/37 N |
| 3,390,119 | 6/1968 | Alexander | 260/37 N |
| 3,391,054 | 7/1968 | Lewis | 260/37 N |
| 3,412,062 | 11/1968 | Johnson | 23/209.1 F |
| 3,450,662 | 6/1969 | Tierney | 260/37 N |
| 3,464,935 | 9/1969 | Sepkoski | 260/37 N |
| 3,248,373 | 4/1966 | Barringer | 260/77.5 |

Primary Examiner—Morris Liebman
Assistant Examiner—P. R. Michl
Attorney—Cushman, Darby & Cushman

[57] ABSTRACT

Fiber reinforced synthetic resin composites suitable for use e.g. in aerofoil blades for compressors, turbines and the like in which the fibers are carbonized fibers and the resin is the product of curing an isocyanate terminated prepolymer obtained by a reacting a polyisocyanate with a polyol at least one of which contains a cyclic group in a chain between two functional (i.e. hydroxyl or isocyanate) groups, and has a heat distortion temperature of at least 50° C., and the fibers form from 20 to 75 percent by weight of the composite.

6 Claims, No Drawings

CARBON FIBER-REINFORCED POLYURETHANE COMPOSITES

This invention relates to fiber-reinforced synthetic resin composites.

In the construction of articles such as turbine and rotor blades where a high stiffness to weight ratio is desired, there is an increasing interest in using fiber-reinforced synthetic resin composites in place of the metals, such as titanium and aluminum, conventionally used in such applications. To be suitable for this kind of use the composites not only require a very high stiffness to weight ratio but also need to satisfy other stringent criteria. Thus, for many applications, e.g. the front blades of compressors, they must be able to resist damage by flying debris and therefore need good impact resistance, and they must also be able to withstand long term exposure to operational temperatures which are usually above room temperature.

Although fiber-reinforced (and especially carbon fiber reinforced) composites from many thermoplastic material would theoretically satisfy these desiderata, especially when the thermoplastics have glass/rubber transition temperatures above 150° C. e.g. as in the case of some polyarylsulphones, polyphenylene oxides and polyaryl carbonates, they are very difficult to use in practice. Their fabrication in conjunction with fibrous reinforcements requires impractically high temperatures and pressures in order to obtain the thermoplasts in a sufficiently fluid state to wet the fibers adequately. Attention has therefore been focused on those resins which pass through a relatively fluid partially reacted prepolymer, or so-called 'B', stage before curing. The desired high temperature characteristics can be attained by these resins as a result of the final cure through the generation of a high level of cross-linking which produces a rigid immobile resin. However, even the most promising composites developed so far on the basis of these resins (that is, those based on the so-called epoxy novolaks for example) have generally been found to have poor impact resistance and this is thought to be due, at least in part, to inadequate inter-laminar shear strength, good inter-laminar shear strength being generally regarded as being one of the pre-requisites in a composite for the achievement of good overall resistance to impact by, for example, flying debris. The inadequate values obtained for inter-laminar shear strength in these composites may be due to poor adhesion between the resin and the fiber or because the resin itself is inferior, or for a combination of both reasons. The problem of fiber- to - resin adhesion is said to be particularly acute in the case of carbonized fibers.

According to the present invention we provide a fiber-reinforced synthetic resin composite wherein the resin is the product of curing an isocyanate-terminated prepolymer obtained by reacting a polyisocyanate with a polyol at least one of which contains a cyclic group in a chain between two functional (i.e. hydroxyl or isocyanate) groups, and has a heat distortion temperature (measured in accordance with British Standard Test 102C but with the sample in a fanned air oven and using a heating rate of 2° C. per minute) of at least 50° C., and the fibers are carbonized fibers and form from 20 to 75 percent by weight of the composite.

The cyclic groups in the polyisocyanate and/or polyol may be, for example, cycloaliphatic, mono- or polynuclear aromatic, or heterocyclic, e.g. as in cyclic ethers and imidazoles, but will commonly be selected from benzene rings and cycloalkylene groups or substituted derivatives thereof wherein one or more of the hydrogen atoms on the ring carbon atoms may be replaced by groups which are unreactive towards hydroxyl and isocyanate groups, e.g. halogen atoms, monovalent hydrocarbon groups, monovalent oxyhydrocarbon groups and halogenated derivatives of these groups.

These composites may be prepared through the desirable 'B' stage and in the cured state exhibit adequate thermal properties and improved inter-laminar shear strength and impact resistance.

The preferred composites are those wherein the cured resin has a heat distortion temperature of at least 100° C. and an impact strength (measured using a Charpy Impact Tester at room temperature (20° C.) on an unnotched specimen 51 mm long × 6 mm × 3 mm) of at least 20 kg. cm/cm².

The isocyanate terminated prepolymer may be formed in known manner by reacting polyol and polyisocyanate in proportions in which the ratio of isocyanate to hydroxyl groups is greater than 1 to 1, and preferably at least 1.1 to 1, most preferably at least 1.3 to 1, e.g. 1.3 to 1 to 2 to 1.

Preferably the prepolymers are substantially linear, being formed from a polyol/polyisocyanate mixture of which, for example, the average overall functionality (that is the average number of functional groups per molecule) is not more than 2.2.

One group of resins suitable for use in our composites comprises those obtained by curing the isocyanate terminated urethane prepolymer obtained by the reaction of aromatic diisocyanates, preferably symmetrical, with glycols; e.g. the product from 4,4'-diisocyanatodiphenyl methane and ethylene glycol.

Another group comprises the products obtained by curing the isocyanate terminated urethane prepolymers obtained by the reaction of a diisocyanate with a branched polyol, at least one of the components containing a cyclic group. Examples of suitable prepolymers are those derived from aromatic or aliphatic diisocyanates, e.g. tolylene diisocyanate, 4,4'-diisocyanatodiphenyl methane or hexamethylene diisocyanate, with sucrose-based polyethers, e.g. a sucrose-based polyether having an equivalent weight of about 150; and those derived from aromatic diisocyanates and acyclic branched polyols, e.g. oxypropylated pentaerythritol.

Yet another and preferred group comprises polyoxazolidone products obtained by curing isocyanate terminated urethane prepolymers, obtained by the reaction of a polyisocyanate with a polyol (at least one of which has a cyclic group), with a polyepoxide, (that is, a compound containing two or more epoxy groups) e.g. vinylcyclohexene diepoxide or the bis glycidyl ether of 2,2-bis(p-hydroxyphenyl)propane.

Another preferred group comprises poly(triazolotriazolone) products obtained by curing isocyanate terminated urethane prepolymers, obtained by the reaction of a polyisocyanate with a polyol (at least one of which has a cyclic group), with an azino compound e.g. benzaldazine.

Further preferred groups comprise the products obtained by curing isocyanate terminated urethane prepolymers, obtained by the reaction of a polyisocyanate with a polyol (at least one of which has a cyclic group), with carbodiimides, isothiocyanates or Schiff's bases.

Most preferably, however, the resins are obtained by curing substantially linear isocyanate terminated urethane prepolymers containing cyclic groups, especially aromatic or cycloaliphatic groups, in the polymer chains, there being not more than 12 atoms in the longest chains between adjacent cyclic groups, the curing being effected either by means of a catalyst capable of promoting further reaction of the isocyanate groups to effect cross-linking by trimerization, or by reacting said prepolymers with at least one organic compound containing one or more functional groups which separately or in combination will react with at least two isocyanate groups to form one or more cyclic or polycyclic adducts.

Where the urethane prepolymers contain not more than 12 carbon atoms in the chain between each cyclic group, they may be said to have the structure

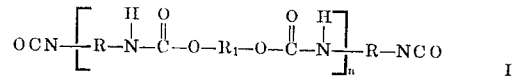

$$OCN {\left[ R-N-\overset{O}{\underset{H}{C}}-O-R_1-O-\overset{O}{\underset{H}{C}}-N-R \right]}_n -NCO \qquad I$$

where R and R₁ are each divalent organic groups at least one of which contains at least one cyclic group in the chain between the free valencies, and are such that in said structure there are no more than 12 atoms in the chain between each cyclic group, and *n* is a whole number which will usually be from 1 to 10.

The resins obtained from these prepolymers may be said to comprise a number of short urethane prepolymer chains having the structure

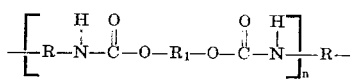

linked together by isocyanurate groups (in the case of trimerization) or other polyvalent groups in which each free valency is attached to a nitrogen atom and which have the structure X or [R'] $X_m$ where each X is a polyvalent cyclic or spiro- or fused-polycyclic group, R' is a polyvalent organic residue in which there are no more than 12 atoms in the chain between each pair of X groups, and *m* is a whole number of at least 2.

Catalysts which promote the trimerization of isocyanates thus forming products containing an isocyanurate ring structure, i.e. where X is

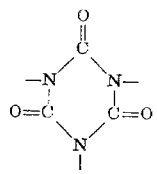

have been widely described in the prior art including, for example, our British Pat. specifications Nos. 809,809, 837,120 and 856,372 and U.S. Pat. Nos. 2,978,449, 3,108,100 and 3,367,934.

Suitable catalysts include strong bases such as quaternary ammonium hydroxides for example benzyltrimethylammonium hydroxide, alkali metal hydroxides for example potassium hydroxide, and alkali metal alkoxides for example sodium methoxide. Other suitable catalysts include materials of a more weakly basic nature such as alkali metal salts of carboxylic acids, for example sodium acetate, potassium acetate, potassium 2-ethylhexoate, potassium adipate and sodium benzoate; certain tertiary amines, for example N-alkyl-ethylene-imines, N-(2-dimethylaminoethyl)-N'-methyl-piperazine, and tris-(N,N-dimethyl-3-aminopropyl)hexahydro-s-triazine. Other suitable catalysts include non-basic metal salts of carboxylic acids, for example lead and calcium salts of carboxylic acids e.g. octoic acid and naphthenic acid, for example lead octoate. In many cases it is advantageous to use in conjunction with the aforesaid catalysts, materials which are not, in themselves, capable of polymerizing isocyanates to any substantial extent. Such materials include the majority of aliphatic tertiary amines, for example 1,4-diazabicyclo(2.2.2.)octane and N,N-dimethylbenzylamine, certain organic metal compounds, for example stannous octoate and dibutyltin dilaurate, and epoxides, for example propylene oxide, phenyl glycidyl ether and the diglycidyl ether of 2,2-bis(4-hydroxyphenyl)propane. Some tertiary amines, for example 1,4-diazabicyclo(2.2.2)octane and N,N-dimethylcyclohexylamine will behave as catalysts for the polymerization of isocyanates in the presence of epoxides. Many of these materials, for example tertiary amines and tin compounds, are, of course, well known as catalaysts for the reaction between isocyanates and hydroxy compounds.

As examples of organic compounds of the kind containing one or more functional groups which separately or in combination will react with at least two isocyanate groups to form one or more cyclic or polycyclic adducts may be mentioned compounds containing at least two epoxy groups, hereinafter referred to as polyepoxides, and compounds containing one or more >C=N— groups Specific examples of suitable compounds are as follows:

i. Polyepoxides, which may be represented as having the general structure

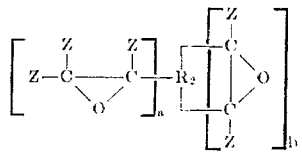

where each Z is —H or —Y and Y is a monovalent organic group which is free from isocyanate-reactive atoms or groups, and the Z's may be the same or different, R' is as defined above, and *a* and *b* are each selected from zero and positive integers, the sum of *a* and *b* being at least 2. Y may be aromatic, aliphatic or a combination of the two and is suitably a monovalent hydrocarbon group or a substituted, e.g. halogenated, derivative thereof. The polyepoxides react with '*a*' plus '*b*' isocyanate groups to yield polyoxazolidones having the structure

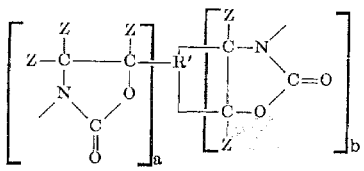

or equivalent where the nitrogen and oxygen atoms in the oxazolidone rings have exchanged positions. Examples of polyepoxides that may be used are vinyl cyclohexene diepoxides, 4-isopropenyl-2,3-dimethylcyclohexene-2,3-diepoxide, 3-methyl heptadiene-2,5-diepoxide, 1,4-diisopropenyl benzene diepoxide, 1,4-butane diol-di($\beta$-methyl glycidyl)ether, 1,2-ethylene glycol di(2,3-epoxycyclohexyl)ether, and the poly(glycidyl ethers) of compounds containing one or more hydroxyphenyl groups, e.g. the diglycidyl ether of 2,2-bis(p-hydroxyphenyl)propane.

ii. Azino compounds such as aldazines and ketazines each molecule of which reacts with two isocyanate groups to form a triazolotriazolone wherein the relevant ring structure is

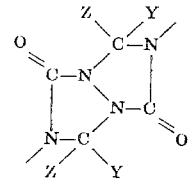

where Y and Z are as defined above.

Examples of azino compounds that may be used include the condensation products of hydrazine with the following aldehydes and ketones: aliphatic aldehydes, e.g. acetaldehyde and butyraldehyde; homocyclic aldehydes, e.g. benzaldehyde and nuclearly substituted derivatives thereof; heterocyclic aldehydes, e.g. furfuraldehyde; aliphatic ketones, e.g. acetone and methyl ethyl ketone; cycloaliphatic ketones, e.g. cyclohexanone; alkylaryl ketones, e.g. acetophenone; and heterocyclic ketones, e.g. 2-furylmethyl ketone and methyl-2-thienyl ketone.

iii. Aldimines of aromatic aldehydes, each molecule of which reacts with two isocyanate groups to form a diketocyanidine ring having the structure

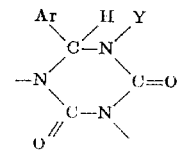

where Y is as defined above and Ar is a monovalent aromatic group which is free from isocyanate-reactive atoms or groups. Examples of aldimines that may be used are the condensation products of e.g. benzaldehyde or naphthaldehyde with a primary monoamine e.g. methylamine, ethylamine, n-propylamine, isopropylamine, cyclohexylamine and aniline.

iv. Bis(aldimines) obtained by the condensation in the molar ratio of 2:1 of an aromatic aldehyde, e.g. benzaldehyde or napthaldehyde, with a diamine wherein the amino groups are linked by a chain of not more than 12 atoms, e.g.hexamethylene diamine,2,2,4- and 2,4,4-trimethyl hexamethylene diamines, decamethylene diamine, 1,4-di(aminoethyl)cyclohexane and dodecamethylene diamine. Each molecule of a bisaldamine may react with two to four isocyanate groups to yield products having the structure

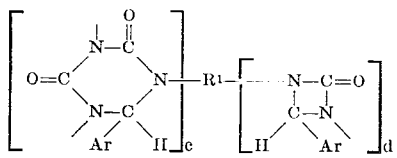

where R' and Ar are each as defined above, each of c and d is 0, 1 or 2 and c+d equals 2.

v. Carbodiimides, each molecule of which may react with from two to four isocyanate groups to yield products of the structure

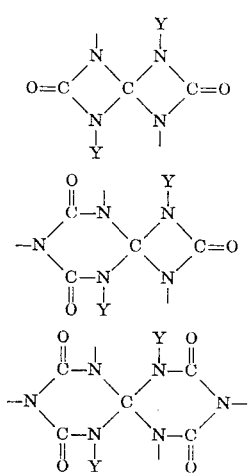

where each Y is as defined above. Carbodiphenyldiimide is an example of a carbodiimide that may react in this manner.

The prepolymer may be formed in conventional manner by reaction of a diol (or mixture of diols) having the structure $HOR_1OH$ with a molar excess of a diisocyanate (or mixture of diisocyanates) having the structure OCNRNCO in the molar ratios referred to hereinbefore. The value of $n$ in the prepolymer will depend upon the molar ratio, decreasing as the ratio increases.

As the nature of $R_1$ in the diol and R in the diisocyanate must be such that in the structure

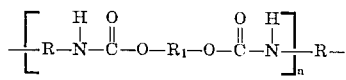

there is at least one cyclic group in the chain between the free valencies and no more than 12 atoms in the chain between each cylic group, it will be appreciated that if only one of R and $R_1$ contains a cyclic group, even if that cyclic group is directly attached to the nitrogen atom of an isocyanate group or an oxygen atom of a hydroxyl group, as the case may be, the other of R and $R_1$ may not contain a chain of more than six atoms. Preferably, both the diol and the diisocyanate contain cyclic groups, and most preferably there are no more than nine atoms in the chain between each cyclic group. The cyclic groups are preferably carbocyclic, e.g. cycloaliphatic or aromatic e.g. benzene rings or cycloalkylene groups or substituted derivatives thereof wherein one or more of the hydrogen atoms on the ring carbon atoms may be replaced by groups which are unreactive toward hydroxyl and/or isocyanate groups, e.g. halogen atoms, monovalent hydrocarbon groups, monovalent oxyhydrocarbon groups and halogen-substituted derivatives of these groups.

Examples of diols having cyclic groups and which may be used in the preparation of the prepolymer include cycloalkane diols, cycloalkanedialkanols e.g. cyclohexylene dimethanols, polycycloalkane diols, polycycloalkanedialkanols, hydroxycycloalkane alkanols, hydroxypolycycloalkane alkanols, aryldialkanols and condensates of alkylene oxides with aromatic compounds containing two phenolic hydroxyl groups.

Thus, for example, $R_1$ may have the structure

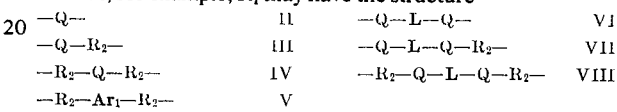

or

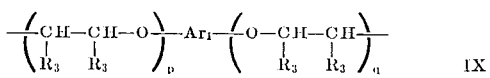

In the e.g. structures, Q is a divalent cycloalkylene or polycycloalkylene group e.g., 1,3-cyclobutylene, 2,2,4,4-tetramethyl-1,3-cyclobutylene, 1,4-cyclohexylene, 1,3-cyclopentylene, 4,4'-spirobicyclohexylene, bicyclo [2,2,1] - 2,5-heptylene and tricyclo [5.2.1.0$^{2\cdot 6}$] decylene.

L is a direct link or a divalent atom or group containing not more than 12 atoms in the chain linking the Q groups and preferably not more than 12 carbon atoms in all, and may be, for example, —O—, —S—, —SO—, —SO$_2$—, —CO—, —N(hydrocarbyl)—, $-(R_4O)_x-$, $-(OR_4)_yO_z-$ or —R$_5$—where R$_4$ is $-(CR_6R_7)_s-$, R$_6$ and R$_7$ are each selected from hydrogen atoms and monovalent hydrocarbon groups preferably having from one to six carbon atoms, e.g. as in methyl, ethyl, isomeric propyl, isomeric butyl, cyclohexyl or phenyl, or R$_6$ and R$_7$ together form a divalent hydrocarbon group e.g. as in pentamethylene, s is a whole number of from 2 to 11, x is a whole number of from 1 to 4 and is such that x(s+1) is not greater than 12, y is a whole number of from 1 to 4, z is 0 or 1 and y and z are such that y(s+1)+z is not greater than 12, and R$_5$ is a divalent hydrocarbon group preferably containing not more than 12 carbon atoms in all, and is especially —CR$_6$R$_7$— where R$_6$ and R$_7$ are as described above, e.g. as in methylene, 2,2-propylene, and 1,2-ethylene.

The oxygen in $-(R_4O)_x-$ and/or in $-(OR_4)_y-$ may be replaced by, for example, —S—, —SO—, —SO$_2$—, —CO— or —N(hydrocarbyl)— and where x or y is greater than one, the substituents may vary in each unit. Preferably L is —CR$_6$R$_7$— where each of R$_6$ and R$_7$ is a hydrogen atom or a monovalent hydrocarbon group containing from one to six carbon atoms or R$_6$ and R$_7$ together form a divalent hydrocarbon group, e.g. $-(CH_2)_5-$.

Each R$_2$ is a divalent acyclic hydrocarbon group having a chain of not more than nine, and preferably from one to six, carbon atoms between the free valencies. Preferably R$_2$ is methylene or polymethylene having up to six carbon atoms.

Each AR$_1$ is a divalent aromatic group; that is, a divalent group in which each free valency is on an aromatic carbon atom. Ar$_1$ may be mononuclear e.g. as in phenylene, fused polynuclear e.g. as derived from naphthalene or anthracene, or, preferably has the structure

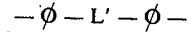

where each O is a phenylene group or substituted derivative thereof wherein at least one of the hydrogen atoms is replaced by halogen or an alkyl, aryl, alkoxy or aryloxy group (preferably having up to six carbon atoms) or a halogenated derivative of any of these and L' has the same possibilities as L but is preferably a direct link or —O—, —S—, —SO$_2$—, —

CO—, —OR₄O—, —R₅— or —N(hydrocarbyl) where R₄ and R₅ are as defined above. Most preferably L' is a divalent hydrocarbon group containing preferably not more than 12 carbon atoms in all, especially —CR₆R₇— where R₆ and R₇ are as defined above.

Each R₃ is a hydrogen atom or a monovalent hydrocarbon group or halogenated derivative thereof, preferably a lower alkyl group containing one to four carbon atoms, e.g. methyl, ethyl, isopropyl or n-butyl. Preferably not more than one R₃ in each bracket is hydrogen. Most preferably, the R₃ on each of the two carbon atoms containing the free valency is not hydrogen, (i.e. it is a monovalent hydrocarbon group or halogenated derivative thereof) and the R₃ on each of the other two carbon atoms is hydrogen. $p$ and $q$ are each positive integers of from 1 to 3.

Specific examples of diols containing cyclic groups and which may be used in the preparation of the prepolymer are 1,4-cyclohexane diol, 2,2,4,4-tetramethyl-1-3-cyclobutane diol, 8-hydroxy-4-hydroxymethyl tricyclo [5.2.1.0² ⁶] decane,1,4-cyclohexane dimethanol, tricyclo [5.2.1.0² ⁶] decane dimethanols, 2,2-bis(4-hydroxy-cyclohexyl)propane, benzene-1,4-dimethanol, bis(p-hydroxymethylcyclohexyl)sulphone, condensates of resorcinol and catechol with from 2 to 6 moles/mole of alkylene oxide, and condensates of diphenols of the structure HOφ — L' — φOH, where φ and L' have the meanings ascribed above, with from 2 to 6 moles/mole of alkylene oxide. Mixtures of these diols may be used if desired.

Examples of diisocyanates having cyclic groups and which may be used in the preparation of the prepolymer are those having the structures

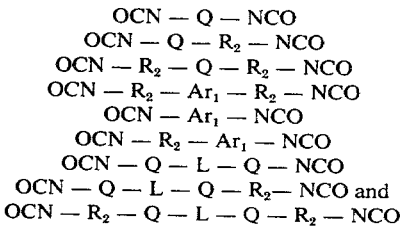

where Q, R₂, Ar₁ and L have the same possibilities as listed above.

Specific examples of such diisocyanates are cyclohexylene diisocyanates, 1,4-bis(isocyanatomethyl)cyclohexane, benzene-1,4-diisocyanate, tolylene diisocyanates, xylylene diisocyanates 4-(β-isocyanatoethyl) phenyl isocyanate, 1,3-bis(isocyanatomethyl)benzene, bis(4-isocyanatocyclohexyl)methane and diisocyanates having the structure OCN — φ — L' — φ — NCO where φ and L' have the possibilities discussed above, e.g. 4,4'-diisocyanatodiphenyl methane, 3,3'-dimethoxy-4,4'-diisocyanatodiphenyl methane and 3,3'-dimethyl-4,4'-diisocyanatodiphenyl methane. Mixtures of these diisocyanates may be used if desired.

While it is desirable for both the diol and the diisocyanate components to contain cyclic groups, it is possible for one or the other to be acyclic. Thus, for example, where the diol is cyclohexane-1,4-diol, the diisocyanate may comprise two isocyanate groups linked together by a chain of up to six atoms, e.g. as in hexamethylene diisocyanate. Similarly, where the diisocyanate is, for example, 4,4'-diisocyanatodiphenyl methane, the diol may comprise two hydroxyl groups linked together by a chain of up to six atoms, e.g. as in ethylene glycol, trimethylene glycol, 1,4-butane diol, 1,5-pentane diol, 1,6-hexane diol and 3,5,5-trimethylhexane-1,6-diol. Mixtures of acyclic and cyclic diols may be used where the nature of the diisocyanate allows and equally mixtures of acyclic and cyclic diisocyanates may be used where the nature of the diol allows.

If desired, polyols and/or polyisocyanates having a functionality greater than two may be included in the reaction mixture to form the prepolymer provided that the prepolymer obtained therefrom it sufficiently stable and fluid (or soluble in a liquid which may be used to improve the flowability of the prepolymer) to be used in the production of a composite by the methods described hereinafter.

Examples of suitable polyhydric alcohols are trimethylol propane, glycerol, 1,2,6-hexanetriol, pentaerythritol, sucrose and their condensates with ethylene oxide and propylene oxide, and condensates of polyols containing an aromatic nucleus, e.g. pyrogallol or phloroglucinol, with propylene oxide and ethylene oxide.

Examples of polyisocyanate components having a functionality greater than 2 are crude diisocyanatodiaryl alkane compositions containing polyisocyanates prepared by phosgenation of crude diaminodiaryl alkanes, which in turn are prepared by the reaction of aromatic amines, or mixtures of aromatic amines, with an aldehyde or ketone, e.g. the reaction of aniline with formaldehyde.

Polymers having a very desirable combination of properties, especially toughness and heat resistance, may be obtained when the polyol consists essentially of a dihydric alcohol having the structure IX but wherein $p$ and $q$ are each at least one and the sum of $p$ and $q$ is not greater than 4, AR₁ has the structure — φ — L' — φ —,each R₃ on a carbon atom having the free valency is a lower alkyl group having from one to four carbon atoms and each R₃ on the other two carbon atoms is hydrogen. In a particularly preferred embodiment, L' is —CR₆R₇— where each of R₆ and R₇ is either a hydrogen atom or a monovalent hydrocarbon group containing up to six carbon atoms, especially methyl, or where R₆ and R₇ together form a divalent hydrocarbon group, e.g. —(CH₂)₅—.

For a particularly desirable combination of impact resistance and conservation of room temperature properties by the polymer at both elevated and subnormal temperatures, and stability of the prepolymer at room temperature and rapid cure of the prepolymer at moderately elevated temperatures, e.g. such as are used with conventional epoxy resins, the prepolymer is preferably the condensate of (a) diphenylmethane diisocyanate (i.e. bis(isocyanatophenyl methane), or the crude product described above of phosgenating an aniline/formaldehyde reaction product, with (b) the product or reacting 2 to 4 moles of propylene oxide with one mole of 2,2-bis(p-hydroxyphenyl)propane.

The prepolymer is conveniently formed by reaction in an inert organic liquid which is a solvent for the reagents and for the urethane prepolymer product. The most suitable solvents are those which are low boiling and which are readily dried. Examples of suitable solvents are chlorinated hydrocarbons such as methylene chloride, chloroform, trichloroethylene etc; acetone, methyl ethyl ketone and ethyl acetate. If desired, the reaction may be aided by addition of a catalyst for urethane formation. Such catalysts are well-known in the art; examples are tertiary amines, heavy metal alkanoates and organo-metal compounds. In general, for direct casting, the choice of catalyst is governed by its effect on the rate of reaction between the polyol and polyisocyanate; the reaction must be sufficiently slow to allow the reaction mixture to be poured and moulded into shape in the mould. For preparation in solution, it is only necessary to consider the control of the exotherm produced.

The urethane prepolymers thus formed are generally solids or syrupy liquids. In the former case, it is generally preferred to leave the prepolymer in solution for ease of handling. Where the prepolymer is liquid, the solvent may be removed if desired although it may be desirable to leave some in order to retain an easily handlable material. Preferably the polyisocyanate and the polyol are chosen to give a prepolymer which in combination with the carbon fibers provides a composite which is easily handled without disintegrating.

To form the fiber-reinforced composites of our invention, the curing agent (preferably either trimerization catalyst or organic compound containing one or more functional groups which separately or in combination will react with at least two isocyanate groups to form one or more cyclic or polycyclic adducts) is added to the prepolymer or solution thereof to form a fluid mass and this is combined with the carbonized fibers and the product cured.

The amount of curing agent to be used will depend largely upon its nature and activity. In general, where the curing agent is a trimerization catalyst, the amount will usually be in the range of from 0.01 to 10 percent and preferably 0.1 to 5 percent, most preferably 0.5 to 3 percent, based on the weight of prepolymer. In the case of organic compounds containing one or more functional groups which separately or in combination will react with at least two isocyanate groups to form one or more cyclic or polycyclic adducts, the amount will usually be about or in excess of the theoretical amount required to react with all the free isocyanate groups, e.g. from 0.9 to 1.5 times the theoretical amount required.

By carbonized fibers, we mean organic fibers that have been carbonized and preferably graphitized. Such fibers may be obtained, for example, by oxidizing and subsequently heating fibers, e.g. of acrylonitrile polymers or copolymers, by methods which are well described in the art to carbonize and/or graphitize them. Temperatures of up to 2,000° C. or even higher are used in the heating step.

In the preferred composites of the invention, the carbon fibers are aligned in the desired direction or directions in accordance with the strains to be placed in the composite in use. Such composites, which exhibit particularly useful mechanical properties, may be formed, for example, by placing a layer of long fibers in a mould, impregnating the fibers with fluid curable prepolymer mixture and then curing the prepolymer. The fibers may be laid individually, or, for example, in the form of bundles, hanks, rovings, tapes, ribbons, mats or tissues.

Preferably a mixture of prepolymer and a thermally activatable curing agent which has little or no reactivity at ambient temperatures is used for the impregnation step thereby producing a fiber-reinforced prepolymer composite which may be handled or worked before the prepolymer is cured. Preferred curing agents for this are trimerization catalysts selected from lead octoate and the combination of phenyl glycidyl ether and N,N-dimethylcyclohexylamine, and organic compounds containing one or more functional groups which separately or in combination will react with at least two isocyanate groups to form one or more cyclic or polycyclic adducts, e.g. polyepoxides, azino compounds, aldimines of aromatic aldehydes, bisaldimines of aromatic aldehydes, and carbodiimides.

To achieve good impregnation of the fibrous material, it may be desirable to reduce the viscosity of the mixture by addition of a suitable organic diluent, e.g. a chlorinated hydrocarbon. The diluent may be removed after impregnation and before or simultaneously with the curing step, e.g. by volatilization.

A particularly preferred process comprises impregnating the fiber with excess of the fluid mixture, applying pressure to squeeze out the excess, e.g. using a leaky mould, removing any organic diluent and then curing the prepolymer, e.g. by heat.

Where comparatively thick articles are required, a number of impregnated layer composites may be prepared in the manner just described, a stack formed from these layers and then the prepolymer may be cured, e.g. by heat, preferably while pressing the layers together. With this process it is preferred to use a prepolymer that in the uncured or partially cured state is an oily or waxy solid or a gum so that the prepolymer/fiber composites may be easily handlable. If desired, a mixture of different prepolymers may be used.

In a much preferred process, the impregnated fibers (in the form of a single layer or more than one layer, as desired) are placed in a mould that has been preheated above the softening point of the prepolymer; that is above the minimum temperature at which a sample of the prepolymer, when stroked with moderate pressure along a heated bar such as a Kofler bar, leaves a wet molten trail. The use of a preheated mould aids flow of the prepolymer before the onset of curing raises the viscosity to too high a level and preferably the temperature of the mould is from about 100° to about 150° C. With use of preheat temperatures much above 150° C., the improvements in flow achieved by use of a hot mould tend to be offset by too rapid a rate of cure.

It is also preferred to apply pressure to the impregnated fibers in the mould while curing trhe resin. The desired pressure will depend upon the nature of the prepolymer and the temperature of the mould and may be determined by simple experiment. It will generally be at least 100 lbs/sq.in. and we prefer to use pressures of at least 1,000 lbs/sq.in.

The resin is preferably cured at a temperature of at least 100° C., and preferably from 100° to 200° C., the time of cure varying in accordance with the temperature, being longer for lower temperatures and shorter for higher temperatures. In general a time of at least 1 hour will be required and at the lower end of the temperature range times of 8 to 10 hours may be found desirable.

In accordance with another but less preferred method of forming the composite, short e.g., chopped fibers may be added to the curable mixture, e.g. to form a putty or dough-like material which may then be moulded and cured.

Composites may be prepared in accordance with this invention having a very desirable combination of thermal properties and impact resistance. Moreover they are tough and creep resistant and are particularly suitable, for example, for use in the production of elongated artefacts intended to be subjected to high tensile forces and to be shatter resistant, e.g. aerofoil-shaped blades for use in, for example, gas turbines, jet-engines, fans and compressors.

Other applications for our composites include hull parts for submarine vessels, airframe and aero-engine components, masts and spars.

In addition to the carbonized fibers and polyurethane resin or resins, our composites may also contain other components if desired, e.g. antioxidants, u.v. absorbers, and fillers, e.g. finely divided metals and metal oxides, carbon black, finely divided graphite, and fibrous fillers, e.g. glass, synthetic resin and asbestos fibers.

The invention is now illustrated by the following examples in which all parts are expressed as parts by weight, and in all of which the composites contain from 20 to 75 percent by weight of carbon fibers.

EXAMPLE 1

A. 20.6 Parts of oxypropylated 2,2-bis(p-hydroxyphenyl)propane, obtained by the reaction of 2 moles of propylene oxide with 1 mole of 2,2-bis(p-hydroxyphenyl)propane were heated and stirred at 60° C. under an absolute pressure of 0.3 mm of mercury for 1 hour. 22.5 parts of 4,4'-diisocyanatodiphenyl methane were treated similarly and separately. The two compounds were then mixed together and stirred under vacuum for 60 seconds at 60° C. The prepolymer so obtained was dissolved in 67 parts of dry methylene chloride, and 0.26 part of phenyl glycidyl ether and 0.03 part of N,N-dimethylcyclohexylamine were added to catalyse the trimerization reaction to isocyanurate. Aliquots of 25 ml of solution so formed were used to impregnate 4 ft. by 3 inch tapes of aligned carbon fibers, each tape weighing 11.0 g. Even resin distribution was achieved by passing the impregnated tapes, protected on each side by PTFE-coated glass cloth, through rubber rollers. The methylene chloride was then removed with the aid of a hot air blower and the impregnated tapes were cut into strips measuring 3 by 1½ inches. Twenty such strips were formed into a stack, and placed into a 3 × 1½ inches mould preheated to 150° C., and a pressure of 1,200 lbs/sq.in. was applied immediately. The mould temperature was maintained at 150° C. for 15 minutes and then gradually reduced to 125° C. over a period of 1¾ hours while maintaining the applied pressure. The sample was then removed from the mould and cut into a number of test pieces measuring 1.25 × 0.25 × 0.1.

The inter-laminar shear strength of each of these test pieces was measured by means of a short beam shear test on a Hounsfield Type 'E' Tensometer using a cross head speed of 0.01 inch/minute, a span:depth ratio of 7.5 to 1 and supporting the specimen in the rig supplied by Hounsfield for use with their type E Tensometer for standard flexural tests.

The value for inter-laminar shear strength was found to be from $7.1 \times 10^3$ to $7.6 \times 10^3$ lbs/sq.in.

The Heat Distortion Temperature of a sample of the unreinforced cured resin was measured in accordance with British Standard 102C but with the sample in a fanned air oven and using a heating rate of 2° C./minute, and found to be 127° C.

B. In a comparative experiment, 44.0 parts of an epoxy novolak resin sold commercially as LY 558 by CIBA Ltd of Great Britain and 4.4 parts of the hardener sold as 'Anchor' 1080 by Anchor Chemicals of Great Britain were dissolved in 67 parts of dry methylene chloride and 25 ml aliquots of the solution were used to impregnate 4 ft. by 3 inch carbon fiber tapes as described above. After rolling between rubber rollers and removing the methylene chloride, both in accordance with the method described above, the impregnated fibers were cut into 3 by 1½ inches strips and 20 such strips were formed into a stack. In accordance with the procedure prescribed for these epoxy novolak resins, the stack was placed in a mould preheated to 160° C., a pressure of 50 lbs/sq.in. was applied immediately and this pressure and temperature were maintained for 20 minutes. The composite was then removed from the mould and post-cured at 180° C. Test samples measuring 1.25 × 0.25 × 0.1 inches were cut from the product and their inter-laminar shear strengths measured in the manner described above. The average value was found to be $5.2 \times 10^3$ lbs/sq.in.

EXAMPLES 2 to 4

The process of Example 1A was repeated in a further series of experiments but varying the temperature of the mould and the conditions of cure.

The results are set out below.

Example 2. Mould preheated to 70° C.; pressure of 1,200 lbs/sq.in. applied immediately; temperature raised to 150° C. over 20 minutes, maintained at 150° C. for 15 minutes and the allowed to reduce to 125° C. over a period of 1¾ hours.

Average value for inter-laminar shear strength = $6.4 \times 10^3$ lbs/sq.in.

Example 3. Mould preheated to 80° C. and temperature thereafter raised to 150° C. over 15 minutes but otherwise as for Example 2.

Average value for inter-laminar shear strength = $6.8 \times 10^3$ lbs/sq.in.

Example 4. As for Example 3 but the application of pressure was delayed until 5 minutes after the stack was placed in the mould.

Average value for inter-laminar shear strength = $6.6 \times 10^3$ lbs/sq.in.

The Heat Distortion Temperature of the resin of Examples 2 to 4 was the same as that of Example 1A.

EXAMPLE 5

A prepolymer formed from 82.4 parts of the oxypropylated bisphenol used in Example 1 and 90.0 parts of 4,4'-diisocyanatodiphenyl methane was dissolved in 400 parts of dry methylene chloride, and 1.04 part of phenyl glycidyl ether and 0.125 part of N,N-dimethylcyclohexylamine added to the solution. Aligned carbon fiber tapes, 4 ft × 3 inch were impregnated with the solution, passed through rollers to ensure an even distribution of resin, and the methylene chloride was removed to give impregnated tapes containing 39 percent by weight of resin. A composite having the dimensions of 10 × 5 × 0.2 inches was prepared as follows: The sheets of impregnated fibers (one fiber in thickness) were cut into suitably shaped pieces to be stacked in a mould measuring 10 by 5 inches in the following manner. In the first layer, the fibers were aligned parallel to the long axis of the mould; in the second, fourth, 36th and 38th layers, the fibers were aligned at an angle of 30° to one side of the mould axis; in the third, fifth, 37th and 39th layers, the fibers were aligned at an angle of 30° to the other side of the mould axis, and in the sixth to 35th and 40th layers, the fibers were aligned parallel to the axis. The stack so formed was placed in a mould at 100° for 30 minutes, the temperature was then raised to 150° C. over 15 minutes and a pressure of 500 lbs/sq.in. was applied for 20 minutes. The temperature was then allowed to fall to 130° C. and the pressure was maintained at this temperature for 6½ hours.

Test samples measuring 1.25 × 0.25 × 0.1 inches and cut from the composite had an average inter-laminar shear strength, measured as described in Example 1 of $6.2 \times 10^3$ lbs/sq.in. The Heat Distortion Temperature of the cured but unreinforced resin was measured as described in Example 1 and found to be 127° C.

EXAMPLE 6

A prepolymer was prepared from 20.6 parts of the oxypropylated bisphenol used in Example 1 and 22.5 parts of 4,4'-diisocyanatodiphenyl methane and was dissolved in 67 parts of dry methylene chloride. 0.15 part of a 50 percent solution of lead octoate in white spirit was added and the solution was diluted with a further 67 parts of dry methylene chloride. Twenty-five ml portions of this solution were used to impregnate aligned tapes of carbon fiber, 4 ft × 3 inch, weighing 11.0g each to give composites containing 33 percent by weight or resin. Even resin distribution was achieved by passing the tapes, sandwiched between PTFE coated glass cloth, through rubber rollers. The methylene chloride was removed with the aid of a hot air blower and the impregnated carbon fibers were cut into 3 × 1½ inches pieces. Twenty such pieces were stacked and placed in a 3 × 1½ inches mould preheated to 150° C. A pressure of 1,200 p.s.i. was applied immediately and maintained for 15 minutes, after which time the temperature was lowered to 125° C. and maintained for 2 hours at the same temperature.

The composite had an average inter-laminar shear strength of $6.5 \times 10^3$ lbs/sq.in. measured as described in Example 1 on samples measuring 1.25 × 0.25 × 0.1 inches. The Heat Distortion Temperature of the cured but unreinforced resin was 127° C. (measured as described in Example 1).

EXAMPLE 7

9.8 Parts of 4,8-bis-(hydroxymethyl)-tricyclo [$5.2.1.0^{2,6}$] decane were heated and stirred at 60° C. under an absolute pressure of 0.3 mm of mercury for 1 hour and then dissolved in 67 parts of dry methylene chloride. 18.7 parts of 4,4'-diisocyanatodiphenyl methane which had been similarly treated were added to the solution in one portion. The solution was stirred for 5 minutes and 0.25 part of a 50 percent solution of stannous octoate in white spirit was added and stirring continued for 2 hours. 0.26 part of phenyl glycidyl ether and 0.03 part of N,N-dimethylcyclohexylamine were then added to the solution and the product was used to impregnate 22 g. of aligned carbon fibers. Even resin distribution and solvent removal were carried out as described in Example 1. 20 strips 3 × 1½ inches cut from the impregnated carbon fibers were stacked and placed in a mould preheated to 150° C. A pressure of 1,200 p.s.i. was applied immediately and maintained for 2 hours. The composite was then removed from the mould after cooling to 100° C.

Test samples, 0.75 × 0.25 × 0.1 inches, had an average inter-laminar shear strength of $5.8 \times 10^3$ p.s.i., measured as described in Example 1.

A sample measuring 3 × 0.25 × 0.1 inches had a shear modulus of $5.7 \times 10^5$ lbs/sq.in. at 20° C. and at 160° C. the value was $2.9 \times 10^5$ lbs/sq.in. Shear modulus was measured using a torsion pendulum at a frequency of 1 c/s on samples with the carbon fibers aligned in the longitudinal direction.

EXAMPLE 8

27.52 parts of the oxypropylated bisphenol used in Example 1 and 8.22 parts of benzalazine (the product of the reaction between 2 moles of benzaldehyde and 1 mole of hydrazine) were heated and stirred at 60° C. under an absolute pressure of 0.3 mm of mercury for 1 hour.

30.0 parts of 4,4'-diisocyanatodiphenyl methane, treated similarly and separately, were added to this mixture and the whole was stirred for 10 minutes. After cooling, 93.5 parts of dry methylene chloride and 0.05 part of a 50 percent solution of stannous chloride were added and the solution was stirred for 15 minutes. It was used to impregnate aligned carbon fibers in the manner described in Example 6. A stack of 20 pieces of impregnated carbon fibers, 3 × 1½ inches, were then placed in a mould preheated to 150° C. and cured at 150° C. and at a pressure of 1,550 lbs/sq.in. for 30 minutes.

The composite had an average inter-laminar shear strength of $5.8 \times 10^3$ lbs/sq.in. measured on samples measuring 1.25 × 0.25 × 0.1 inches, as described in Example 1.

The Heat Distortion Temperature of a sample of the cured but unreinforced resin was 132° C. (measured as described in Example 1).

The very useful inter-laminar shear strength and thermal properties of the composites of the invention are clearly demonstrated in the above Examples 1 to 8. Other desirable properties of the composites are illustrated in the following Examples 9 and 10.

EXAMPLE 9

10.32 g. of oxypropylated 2,2-bis(p-hydroxyphenyl)propane (obtained from the reaction of 2 moles of propylene oxide with 1 mole of 2,2-bis(p-hydroxyphenyl)propane) were heated and stirred at 60° C. under an absolute pressure of 0.3 mm of mercury for 1 hour. 11.25 g. of 4,4'-diisocyanatodiphenyl methane were treated similarly and separately. The two compounds were then mixed together and stirred under vacuum for 60 seconds at 60° C. The reaction vessel was then filled with dry nitrogen and 0.39 g. of phenyl glycidyl ether and 0.048 ml of N,N-dimethylcyclohexylamine added and the mixture stirred for a further 30 seconds. The liquid mixture was poured over 20 g. of a combed hank of graphite fibers and distributed evenly over the fibers by rolling repeatedly with a rubber roller. The composite thereby obtained was then cut up into six strips each measuring 2½ by 3 by one forty-fifth inch and the strips were formed into a stack. The stack was partially cured in an electrically heated hydraulic press at 140° C. under light pressure for 20 minutes and then cure was completed by heating for 16 hours at 140° C.

Samples cut from the cured sheet had the following properties (average):

| | |
|---|---|
| Flexural Modulus: | $1.1 \times 10^5$ kg/cm² |
| Flexural Strength: | $3.4 \times 10^3$ kg/cm² |
| Notched Impact Strength: | $27 \pm 3$ kg.cm/cm² |

Flexural modulus and flexural strength were measured on a Hounsfield Tensometer Type E using 2 × ¼ × ⅛ inch specimens. Notched impact strength was measured using a Charpy type impact tester on specimens 2 × ¼ × ⅛ inch with a V-shaped 45° notch 0.11 inch deep and 0.010 inch radius.

A further sample of the resin composition was cast into an ⅛-inch thick plaque without the carbon fiber reinforcement. The plaque was cured at 60° C. for 10 minutes followed by 100° C. for a further 90 minutes. Samples of the cured plaque had an unnotched impact strength of $27 \pm 4$ kg. cm/cm² and a Heat Distortion Temperature of 134°–136° C.

EXAMPLE 10

A prepolymer formed from 41.2 g. of the oxypropylated bisphenol used in Example 1 and 45 g. of 4,4'-diisocyanatodiphenyl methane, and 0.3 g. of a 50 percent solution of lead octoate were dissolved in 150 ml. of dry methylene chloride and the solution used to impregnate 120 g. of combed graphite fibers. Even resin distribution was ensured by rolling layers of impregnated fibers under light pressure while holding them between sheets of PTFE coated glass cloth. A composite measuring 10 inches long by 5 inches wide was prepared in accordance with the lay-up procedure described in Example 5. The stack so formed was placed in an electrically heated hydraulic press, heated to 160° C. under a pressure of 400 lbs/sq.in. (20,000 lbs/sq.in. distributed over the mould) for 30 minutes, removed from the press and post-cured at 200° C. for 1 hour. A 0.2 inch thick sheet was obtained.

Test samples cut from the composite had the following properties, measured on a Hounsfield Type E Tensometer fitted with a standard metal extensometer attachment.

| | |
|---|---|
| Tensile Modulus: | $9.1 \times 10^5$ kg/cm² |
| Tensile Stress at break: | $3.1 \times 10^3$ kg/cm² |
| Tensile Strain at break: | 0.3% |
| Flexural Strength: | $5.2 \times 10^3$ kg/cm² |

Examples 11 and 12 illustrate further variation of the resinous component of the composite.

EXAMPLE 11

A prepolymer was formed from 23.0 parts of oxypropylated 2,2-bis(p-hydroxyphenyl)propane (obtained from the reaction of 4 moles of propylene oxide with one mole of 2,2-bis(p-hydroxyphenyl)propane) and 25.0 parts of 4,4-diisocyanatodiphenyl methane by the method described in Example 9. 0.065 part of phenyl glycidyl ether and 0.008 part of N,N-dimethylcyclohexylamine were added to the prepolymer and 9 parts of the liquid mixture were poured over 6 parts of combed aligned carbon fibers, and distributed evenly by passing the layers through rollers under light pressure while holding them between sheets of PTFE coated glass cloth. The tacky sheet of impregnated fibers was cut into pieces measuring 1½ × 2 inches and five pieces were formed into a stack. The stack was cured in a pre-heated mould at 1,000 lbs/sq.in. and 150° C. for 30 minutes.

EXAMPLE 12

A prepolymer, formed from 23.0 parts of oxypropylated 2,2-bis-(p-hydroxyphenyl)propane (obtained from the reaction of 4 moles of propylene oxide with one mole of 2,2-bis(p-hydroxyphenyl)propane) and 25.0 parts of 4,4-diisocyanatodiphenyl methane and containing 0.26 part of phenyl glycidyl ether and 0.03 part of N,N-dimethylcyclohexylamine was dissolved in 67 parts of dry methylene chloride. 15 ml. portions of the solution were used to impregnate tapes of aligned carbon fibers 3 inches wide by 4 feet long and weighing 11.0 g. Even resin distribution was ensured by passing the tapes between PTFE coated glass cloth, through rubber rollers under slight pressure, and the methylene chloride was removed with the aid of hot air blower. Strips 1½ × 3 inches were cut from the impregnated tapes and a stack of 26 was cured in a pre-heated mould at 5,000 lbs/sq.in. and 150° for 30 minutes.

Still further variation within the scope of the invention may be obtained, for example, by replacing oxypropylated 2,2-bis(p-hydroxyphenyl) propane by any of the following diols: other oxypropylated bisphenols e.g. oxypropylated bis(hydroxyphenol)methane, oxyethylated bisphenols, e.g. the products of condensing 2,2-bis(p-hydroxyphenyl)propane with from 2 to 4 moles of ethylene oxide. 2,2-bis(4-hydroxycyclohexyl)propane and oxypropylated and oxyethylated derivatives thereof, 8-hydroxy-4-hydroxymethyl tricyclo [$5.2.1.0^{2\ 6}$] decane, 1,4-cyclohexane diol, 1,4-cyclohexane dimethanol and benzene -1,4-dimethanol; or by replacing 4,4'-diisocyanatodiphenyl methane by, for example, toluene diisocyanate, cyclohexylene diisocynates, tolylene diisocyanates or bis(4-isocyanatocyclohexyl)methane, or by using other curing agents such as, for example, a polyepoxide, e.g. the diglycidyl ether of 2,2-bis(p-hydroxyphenyl)propane, an aldimine of an aromatic aldehyde e.g. the condensation product of benzaldehyde with methylamine, a bisaldimine of an aromatic aldehyde e.g. the condensation product of 2 moles of benzaldehyde with hexamethylene diamine, or a carbodiimide e.g. carbodiphenyldiimide.

EXAMPLE 13

This example illustrates the improved resistance of our composites to impact by, for example, flying debris such as might be met under operational use.

A composite having the dimensions 10 × 5 × 0.2 inches was prepared by the method described in Example 10. The composite was clamped vertically and a spherical 10 g. projectile was fired at one of the vertical edges at a predetermined velocity and at an angle of 40° incidence, and the effect of the impact observed visually. The experiment was repeated several times using gradually increasing velocities and aiming always at the same spot until delamination was seen to have occurred. A final shot was then fired on the other vertical edge at the velocity which had first caused delamination in the cumulative test in order to confirm that a single shot at that velocity would cause delamination. Delamination was found to require about 150 ft. lbs. of energy by this test.

The experiment was then repeated using a composite made by exactly the same method but using the epoxy-novolak resin and the moulding and curing conditions described in Example 1B. Delamination was found to require about 65 ft. lbs of energy by this test.

EXAMPLE 14

By way of further demonstration of the improved impact resistance of the composites of our invention, a prepolymer was prepared as described in Example 1 except that 0.1 percent (by weight of the prepolymer) of a 50 percent solution of stannous octoate in white spirit was added to the solution of the diol and diisocyanate in methylene chloride. a 3 × 1½ inches composite was prepared from this prepolymer by the method described in Example 1 but using a stack of 30 layers instead of 20 and a pressure of 9,000 lbs/sq.in. The fiber content was found to be 70 percent by weight of the composite. The behavior under impact was examined on samples 2 × ¼ × ⅛ using a Charpy type impact tester and a 2 lb. weight. The samples did not break but there was slight evidence of delamination.

The experiment was repeated using samples of identical size but wherein the resin was the epoxy novolak of Example 1B. These samples also did not break but there was extensive delamination.

What we claim is:

1. A fiber-reinforced synthetic resin composite wherein the resin is the product of curing an isocyanate terminated prepolymer obtained by reacting a polyisocyanate with a polyol at least one of which contains a cyclic group in a chain between two functional (i.e. hydroxyl or isocyanate) groups, with no more than 12 atoms in the chain between each cyclic group, the average number of functional groups per molecule in the reaction mixture of said polyol and said polyisocyanate being not greater than 2.2, and the resin has a heat distortion temperature of at least 50° C., and the fibers are carbonized fibers and form from 20 to 75 percent by weight of the composite, said resin comprising a series of short urethane prepolymer chains having the structure

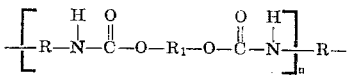

wherein R and $R_1$ are each divalent organic groups at least one of which contains at least one cyclic group in the chain between the free valencies and are such that in said structure there are no more than 12 atoms in the chain between each cyclic group, and n is a whole number of from one to 10, said prepolymer chains being linked together by polyvalent groups having the structure

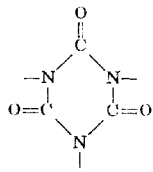

2. A fiber-reinforced synthetic resin composite wherein the resin is the product of curing an isocyanate terminated prepolymer obtained by reacting a polyisocyanate with a polyol at least one of which contains a cyclic group in a chain between two functional groups, with no more than 12 atoms in the chain between each cyclic group, the average number of functional groups per molecule in the reaction mixture of said polyol and said polyisocyanate being not greater than 2.2, and the resin has a heat distortion temperature of at least 50° C., and the fibers are carbonized fibers and form from 20 to 75 percent by weight of the composite, said resin comprising a series of short urethane prepolymer chains having the structure

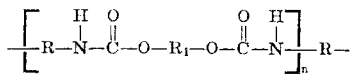

wherein R and $R_1$ are each divalent organic groups at least one of which contains at least one cyclic group in the chain between the free valencies and are such that in said structure there are no more than 12 atoms in the chain between each cyclic group, and n is a whole number of from one to 10, said prepolymer chains being linked together by polyvalent groups other than urethane groups in which each free valency is attached to a nitrogen atom and which have the structure X or $(R')X_m$ where each X is a polyvalent cyclic or spiro- or fused-polycyclic group wherein each ring as from four to six atoms of which at least two are carbon, at least one is nitrogen, at least four are selected from carbon and nitrogen, and up to one is oxygen, and less than all of the carbon atoms in each ring are doubly bound to oxygen atoms, $R'$ is a polyvalent organic residue radical in which there are no more than 12 atoms in the chain between each pair of X groups, and m is a whole number of at least 2.

3. A composite as claimed in claim 2 in which X is selected from

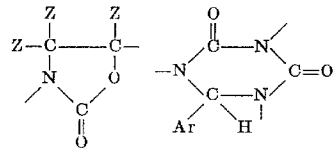

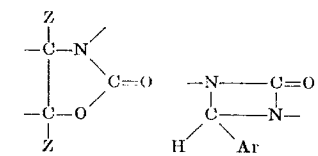

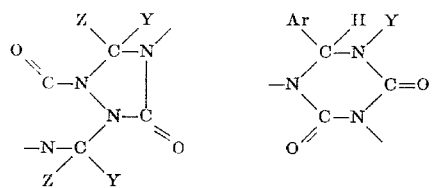

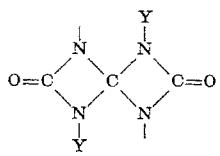

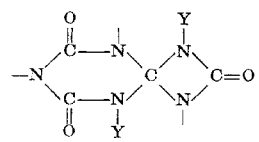

and

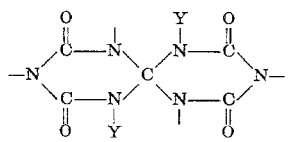

where each Y is a monovalent organic group free from isocyanate-reactive atoms and groups, each Z is —H or —Y, and Ar is a monovalent aromatic group which is free from isocyanate-reactive atoms and groups.

4. A composite as claimed in claim 1 wherein $R_1$ has the structure

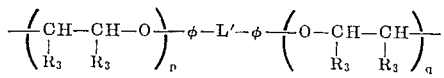

wherein each $R_3$ is a hydrogen atom or a monovalent hydrocarbon group or halogenated derivative thereof, each is a phenylene group or substituted derivative thereof wherein at least one of the hydrogen atoms is replaced by halogen or an alkyl, aryl, alkoxy or aryloxy group or a halogenated derivative of any of these groups and L' is a direct link or a divalent atom or group containing not more than 12 atoms in the chain linking the groups, and $p$ and $q$ are each positive integers of from 1 to 3.

5. A composite as claimed in claim 4 in which L' is $—CR_6R_7—$ where each of $R_6$ and $R_7$ is either a hydrogen atom or a monovalent hydrocarbon group containing up to six carbon atoms or $R_6$ and $R_7$ together form a divalent hydrocarbon group, the $R_3$ on each of the two carbon atoms having a free valency is an alkyl group having from one to four carbon atoms, each $R_3$ on the remaining two carbon atoms is hydrogen, and the sum of $p$ and $q$ is not more than 4.

6. A composite as claimed in claim 5 in which the prepolymer is a condensate of (a) bis(isocyanatophenyl)methane or a crude mixture of diisocyanatodiaryl alkanes prepared by phosgenating crude diaminodiaryl alkane prepared by the reaction of aniline with formaldehyde, and (b) the product of reacting 2 to 4 moles of propylene oxide with one mole of 2,2-bis(p-hydroxyphenyl)propane.

* * * * *